(12) United States Patent
Senba

(10) Patent No.: US 7,394,497 B2
(45) Date of Patent: Jul. 1, 2008

(54) CAMERA WITH VARIABLE APERTURE MEMBER

(75) Inventor: Takehiko Senba, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 777 days.

(21) Appl. No.: 10/809,494

(22) Filed: Mar. 26, 2004

(65) Prior Publication Data
US 2004/0189860 A1 Sep. 30, 2004

(30) Foreign Application Priority Data
Mar. 27, 2003 (JP) ............................. 2003-087803

(51) Int. Cl.
H04N 5/235 (2006.01)
G03B 7/00 (2006.01)

(52) U.S. Cl. ...................... 348/362; 348/370

(58) Field of Classification Search ......... 348/362–364, 348/370
See application file for complete search history.

(56) References Cited

U.S. PATENT DOCUMENTS 5,517,243 A * 5/1996 Kudo et al. ................. 348/296
5,646,769 A * 7/1997 Sato et al. .................. 359/230
6,618,090 B1 * 9/2003 Kidono et al. .............. 348/362
6,693,673 B1 * 2/2004 Tanaka et al. .............. 348/371

FOREIGN PATENT DOCUMENTS

| JP | 04-223450 A | 8/1992 |
| JP | 2580105 B2 | 11/1996 |
| JP | 11-215440 A | 8/1999 |

* cited by examiner

Primary Examiner—Lin Ye
Assistant Examiner—Gevell Selby
(74) Attorney, Agent, or Firm—Sughrue Mion, PLLC

(57) ABSTRACT

A camera has a photometry section. The photometry section measures brightness of field when an aperture member is of a predetermined first aperture caliber which is a relatively large aperture caliber, and measures the brightness of field in halfway through change over of the aperture member from the first aperture caliber to a predetermined second aperture caliber which is relatively smaller than the first aperture caliber when a photometry of the brightness of field is impossible because of an exposure over with the first aperture caliber.

5 Claims, 11 Drawing Sheets

CAMERA WITH VARIABLE APERTURE MEMBER

BACKGROUND OF THE INVENTION

1. Field of the Invention

The present invention relates to a camera incorporating therein an aperture member which is variable in an aperture caliber including a completely closed condition and changes over to an aperture caliber after an alteration with a predetermined response speed in accordance with an alteration instruction of the aperture caliber, wherein a subject light incident through an aperture of the aperture member is received by an imaging device to create image data.

2. Description of the Related Art

Recently, video cameras capable of photographing still pictures have come into wide use.

In such video cameras, in order to ensure clearness needed for still pictures, the number of pixels of CCD to be loaded is increased.

By the way, some video cameras adopt an aperture having a galvanometer addresses as a galvanic aperture. In the video cameras, there are recorded sounds as well as images, and thus there is a need to reduce driving sounds of an aperture, which would vary in accordance with brightness of field. The reason why some video cameras adopt a galvanic aperture is that the galvanic aperture has a feature that it is high in silence property at the time of the driving.

FIG. 1 is a schematic view of a galvanic aperture.

The galvanic aperture shown in FIG. 1 comprises: an aperture blade 103 consisting of a first aperture blade 103a and a second aperture blade 103b; an aperture driving section 100 consisting of a rotatably movable rotor 100a and a post 100b; and a galvanometer 106 having a Hall-effect device 107 which will be described later.

FIG. 2 is an internal structural view of the galvanometer 106.

The galvanometer 106 comprises a rotary shaft 106a, a magnet 106b mounted on the rotary shaft 106a, a driving coil 106c for controlling an amount of rotation of the rotary shaft 106a, the driving coil 106c being mounted on the magnet 106b; and a damping coil 106d.

The galvanometer 106 generates lines of magnetic force when a current conducts through the driving coil 106c, so that the generated magnetic force is utilized as a driving force for rotating the magnet 106b. Alteration of the peripheral magnetic field of the damping coil 106d by the rotation of the magnet 106b may generate electromotive force on the damping coil 106d to control a current conducting through the driving coil 106c, so that the rotation of the magnet 106b is set up to a predetermined angle. The Hall-effect device 107 detects the strength of the magnetic field and the magnetic polarity at the position on which the Hall-effect device 107 is mounted to obtain rotary angle information of the magnet 106b.

The galvanic aperture is associated with an aspect that the aperture is apt to vary, since the aperture blade 103 is of a float structure.

FIG. 3 is a view showing a state that an aperture caliber of the galvanic aperture is changed to an aperture caliber of the target.

FIG. 3 shows a state that the aperture caliber varies from the "open end" side to an aperture caliber of the target, and in addition shows an aspect that it takes some time up to the galvanic aperture becomes steady to a predetermined aperture caliber.

By the way, according to the general digital still camera, in case of photography, first, photometry of the subject brightness by the provisional photography is carries out. And after the photographic conditions such as the aperture caliber and the shutter speed at the time of the regular photography are set up in accordance with the thus obtained subject brightness, the photography is carries out in accordance with the photographic instruction.

The above-mentioned photometry is first carried out in a state that the aperture caliber is in the "open end". At that time, if it is possible to grasp brightness in all areas on the imaging device such as CCD, photographic conditions are set up in accordance with the brightness. However, in the event that there are areas on the imaging device in which the subject brightness cannot be grasped, in order to grasp the brightness of the area, which cannot be grasped, again photometry is carried out, while the aperture caliber is in a state of the "stop".

In a video camera having such a galvanic aperture, in consideration of the still picture photography, it is considered that there is a need that in case of a failure of grasp of the subject brightness through the first time of photometry, the second time of photometry is carried out while the aperture caliber is steadied to the "stop". Further, it is considered that the still picture photography is performed in a state that the aperture caliber is steadied to an aperture caliber different from the "stop", which is set up in accordance with brightness information obtained through the photometry. In view of the fact that the video camera requires a time up to the aperture caliber becomes steady, whenever the aperture caliber is varied for the photometry and the regular photography, there is a possibility that a photography, which is different from a camera operator's intention, is performed.

In view of the foregoing, there is proposed a technology of contributing to speed-up of the variation of the aperture at the "open" side (cf. for example, Japanese Patent Application Laid Open Gazette TokuKai Hei. 4-223450).

FIG. 4 is a view showing variations of F-values of an aperture from the open end to the close end, as a rotary shaft of the galvanometer rotates.

From FIG. 4, it would be understood that even if the rotary shaft of the galvanometer rotates by the same angle, a degree of the variation of the F-values is different in the aperture caliber between the "open" side and the "stop" side.

According to the above-proposed technology (Japanese Patent Application Laid Open Gazette TokuKai Hei. 4-223450), it is intended to contribute to speed-up of an operating speed of the aperture at the "open" side in such a manner that a lowering of rate of change of an aperture area to change of the rotary shaft of the galvanometer at the "open" side as compared with the "stop" side, as shown in FIG. 4, is compensated by means of providing a circuit for causing rate of change of an aperture area to change of a meter angle from the "stop" side to the "open" side to be constant.

However, according to the above-proposed technology (Japanese Patent Application Laid Open Gazette TokuKai Hei. 4-223450), while the operating speed at the "open" side is increased, there remains the above-mentioned problem since the operating speed at the "stop" side is decreased.

The above-mentioned problem is also applicable to a digital still camera adopting a galvanic aperture for the necessity of silence property of driving sounds, for instance, as well as the video camera having a galvanic aperture.

SUMMARY OF THE INVENTION

In view of the foregoing, it is an object of the present invention to provide a camera capable of reducing a time necessary for photography.

To achieve the above-mentioned objects, the present invention provides a first camera incorporating therein an aperture member which is variable in an aperture caliber including a completely closed condition and changes over to an aperture caliber after an alteration with a predetermined response speed in accordance with an alteration instruction of the aperture caliber, wherein a subject light incident through an aperture of the aperture member is received by an imaging device to create image data, the camera comprising:

a sensor that monitors the aperture caliber of the aperture member;

an aperture control section that controls the aperture caliber of the aperture member;

a photometry section that measures brightness of field in accordance with light quantity of received light by the imaging device, and an exposure control section that controls an exposure in accordance with the brightness of field measured by the photometry section, wherein the photometry section measures the brightness of field when the aperture member is of a predetermined first aperture caliber which is a relatively large aperture caliber, and measures the brightness of field in halfway through change over of the aperture member from the first aperture caliber to a predetermined second aperture caliber which is relatively smaller than the first aperture caliber when a photometry of the brightness of field is impossible because of an exposure over with the first aperture caliber, and wherein the exposure control section controls the exposure in accordance with the brightness of field measured by the photometry section and an aperture caliber in a photometric timing of the brightness of field, of the aperture member, which is monitored by the sensor, when the photometry section measures the brightness of field in halfway through change over of the aperture member from the first aperture caliber to the second aperture caliber.

According to the first camera of the present invention, as compared with the prior art in which when the photometry of the brightness of field is impossible with the first aperture caliber, the photometry of the brightness of field is performed again with the second aperture caliber to set up conditions for an adequate exposure, in the event that the photometry of the brightness of field is impossible with the first aperture caliber, the grasp of the brightness of field is performed before the aperture becomes the second aperture caliber. This feature makes it possible to promptly set up conditions for the adequate exposure. Therefore, according to the first camera of the present invention, it is possible to reduce a time required for photography.

In the first camera according to the present invention as mentioned above, it is preferable that the camera further comprises a photography timing control section that performs photography in a state that the aperture member is in the first aperture caliber and in a state that the aperture member is steadied to the second aperture caliber in accordance with whether a photometry of the brightness of field, wherein the aperture member is in the first aperture caliber, is possible or impossible, and wherein the exposure control section controls a shutter speed.

In the event that the photometry of brightness of field in the first aperture caliber is impossible, it is possible to obtain luminance information more promptly as compared with the conventional ones, and in addition it is possible to perform the regular photography at the time point that the aperture caliber is steadied to the second aperture caliber. Therefore, according to the digital camera 1 of the present invention, it is possible to reduce a time required for photography.

In the first camera according to the present invention as mentioned above, it is preferable that the camera further comprises a photography timing control section that performs photography in a state that the aperture member is in the first aperture caliber and performs photography regardless of a state that the aperture member is steadied to the second aperture caliber in accordance with whether a photometry of the brightness of field, wherein the aperture member is in the first aperture caliber, is possible or impossible, and wherein the exposure control section controls a shutter speed, and in a case where a measurement of the brightness of field is impossible when the aperture member is in the first aperture caliber, the exposure control section controls the shutter speed in accordance with the brightness of field measured by the photometry section in halfway through change over of the aperture member from the first aperture caliber to the second aperture caliber, an aperture caliber in a photometric timing of the brightness of field, of the aperture member, which is monitored by the sensor, and an aperture caliber in a photographic timing, of the aperture member, which is monitored by the sensor.

This feature makes it possible to reduce a time required for photography.

To achieve the above-mentioned objects, the present invention provides a second camera incorporating therein an aperture member which is variable in an aperture caliber including a completely closed condition and changes over to an aperture caliber after an alteration with a predetermined response speed in accordance with an alteration instruction of the aperture caliber, wherein a subject light incident through an aperture of the aperture member is received by an imaging device to create image data, the camera comprising:

an aperture control section that controls the aperture caliber of the aperture member;

a photometry section that measures brightness of field in accordance with light quantity of received light by the imaging device, and an exposure control section that controls an exposure in accordance with the brightness of field measured by the photometry section, wherein the photometry section measures the brightness of field when the aperture member is of a predetermined first aperture caliber which is a relatively large aperture caliber, and measures the brightness of field in halfway through change over of the aperture member from the first aperture caliber to a predetermined second aperture caliber which is relatively smaller than the first aperture caliber when a photometry of the brightness of field is impossible because of an exposure over with the first aperture caliber, wherein the camera further comprises a photography timing control section that performs photography in a state that the aperture member is in the first aperture caliber and performs photography regardless of a state that the aperture member is steadied to the second aperture caliber in accordance with whether a photometry of the brightness of field, wherein the aperture member is in the first aperture caliber, is possible or impossible, and wherein the exposure control section controls a shutter speed, and in a case where a measurement of the brightness of field is impossible when the aperture member is in the first aperture caliber, the exposure control section controls the shutter speed regarding as the brightness of field measured by the photometry section in halfway through change over of the aperture member from the first aperture caliber to the second aperture caliber being measured when the aperture member is in the second aperture caliber, and an exposure is corrected on the created image data.

According to the second camera of the present invention, in a case where a measurement of the brightness of field is impossible when the aperture member is in the first aperture caliber, the exposure control section controls the shutter speed regarding as the brightness of field measured by the photometry section in halfway through change over of the aperture member from the first aperture caliber to the second aperture caliber being measured when the aperture member is in the second aperture caliber, and an exposure is corrected on the created image data. This feature makes it possible to reduce a time required for photography.

DETAILED DESCRIPTION OF PREFERRED EMBODIMENTS

Embodiments of the present invention will be described with reference to the accompanying drawings.

Figure 1:
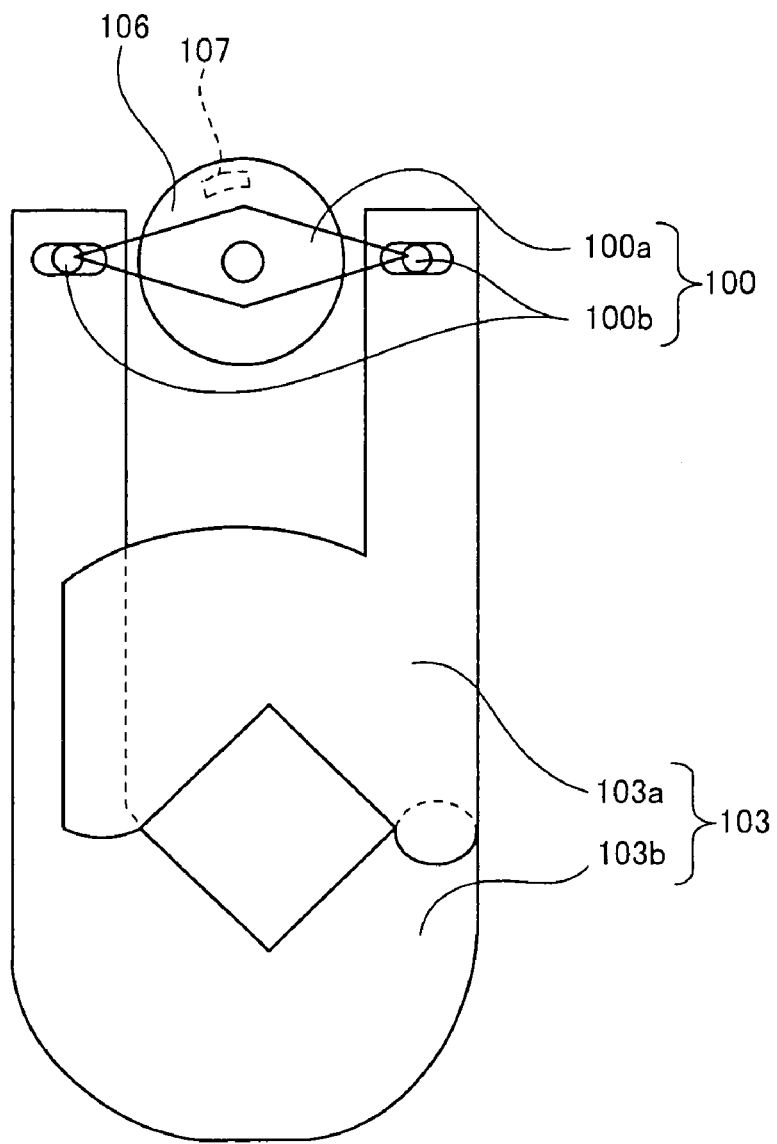
FIG. 1 is a schematic structural view of a galvanic aperture.
Figure 2:
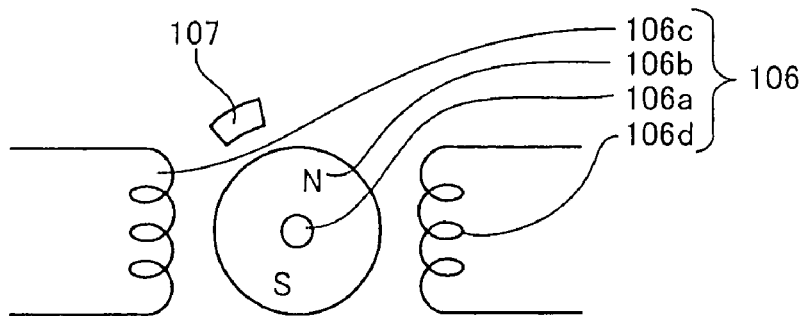
FIG. 2 is an internal structural view of a galvanometer.
Figure 3:
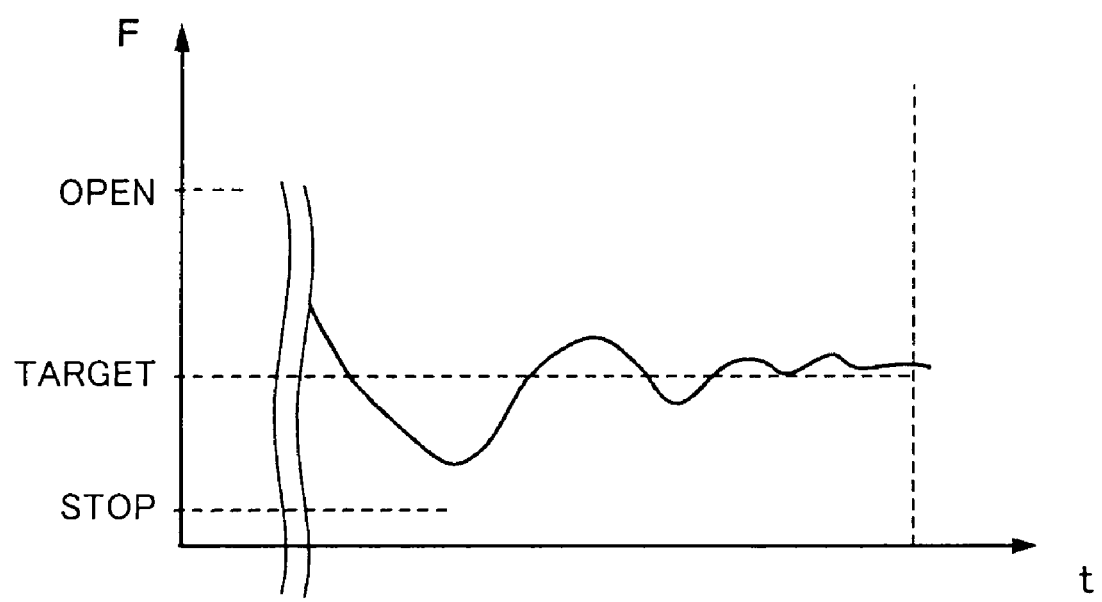
FIG. 3 is a view showing a state that an aperture caliber of the galvanic aperture is changed to an aperture caliber of the target.
Figure 4:
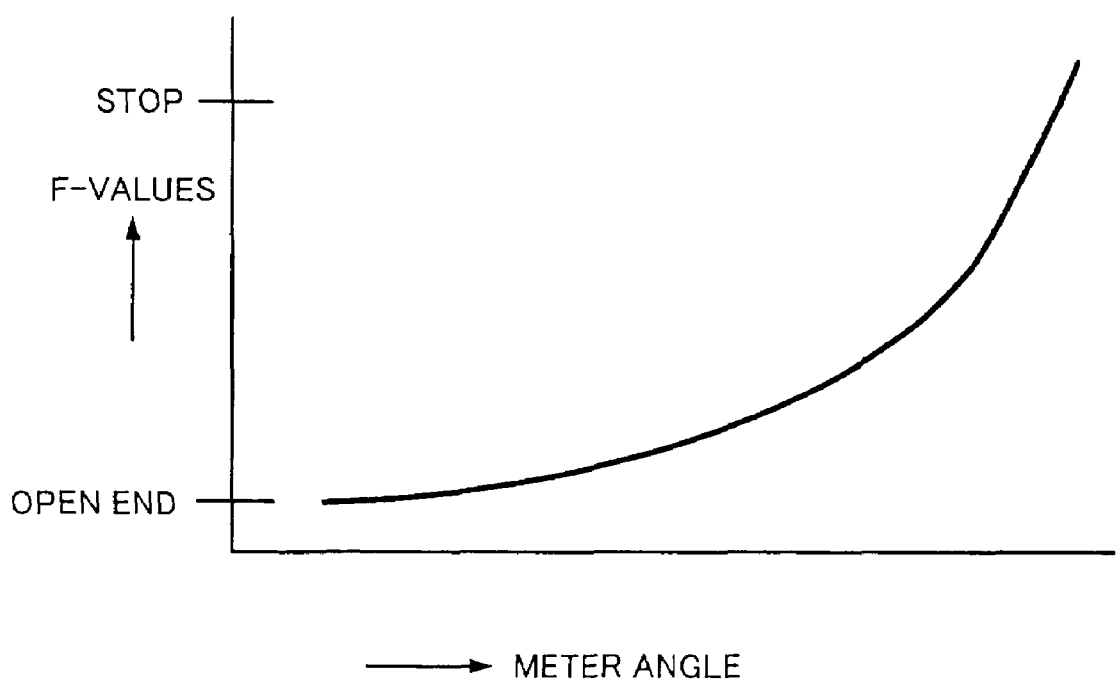
FIG. 4 is a view showing variations of F-values of an aperture from the open end to the close end, as a rotary shaft of the galvanometer rotates.
Figure 5:
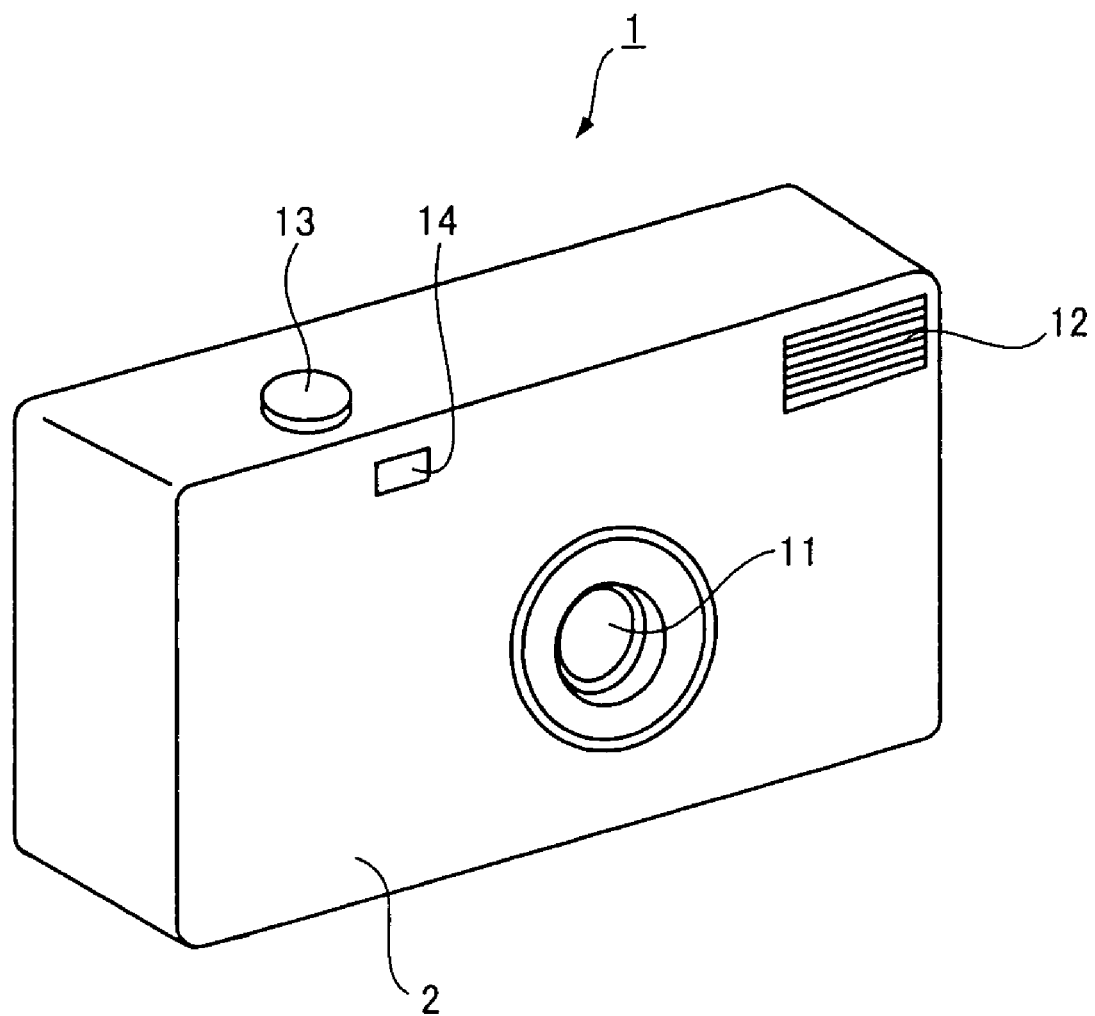
FIG. 5 is a perspective view of a camera according to an embodiment of the present invention.

FIG. 5 is a perspective view of a camera according to an embodiment of the present invention.

A digital camera 1 shown in FIG. 5 has a function of imaging a subject image formed on a CCD solid state imaging device with a still picture and in addition a function of imaging the subject image with a dynamic picture image.

The digital camera 1 shown in FIG. 5 comprises a cover member 2, a flashlight-emitting window 12, a release button 13 constituted of a two-stage of switch, and a finder objective window 14.

Figure 6:
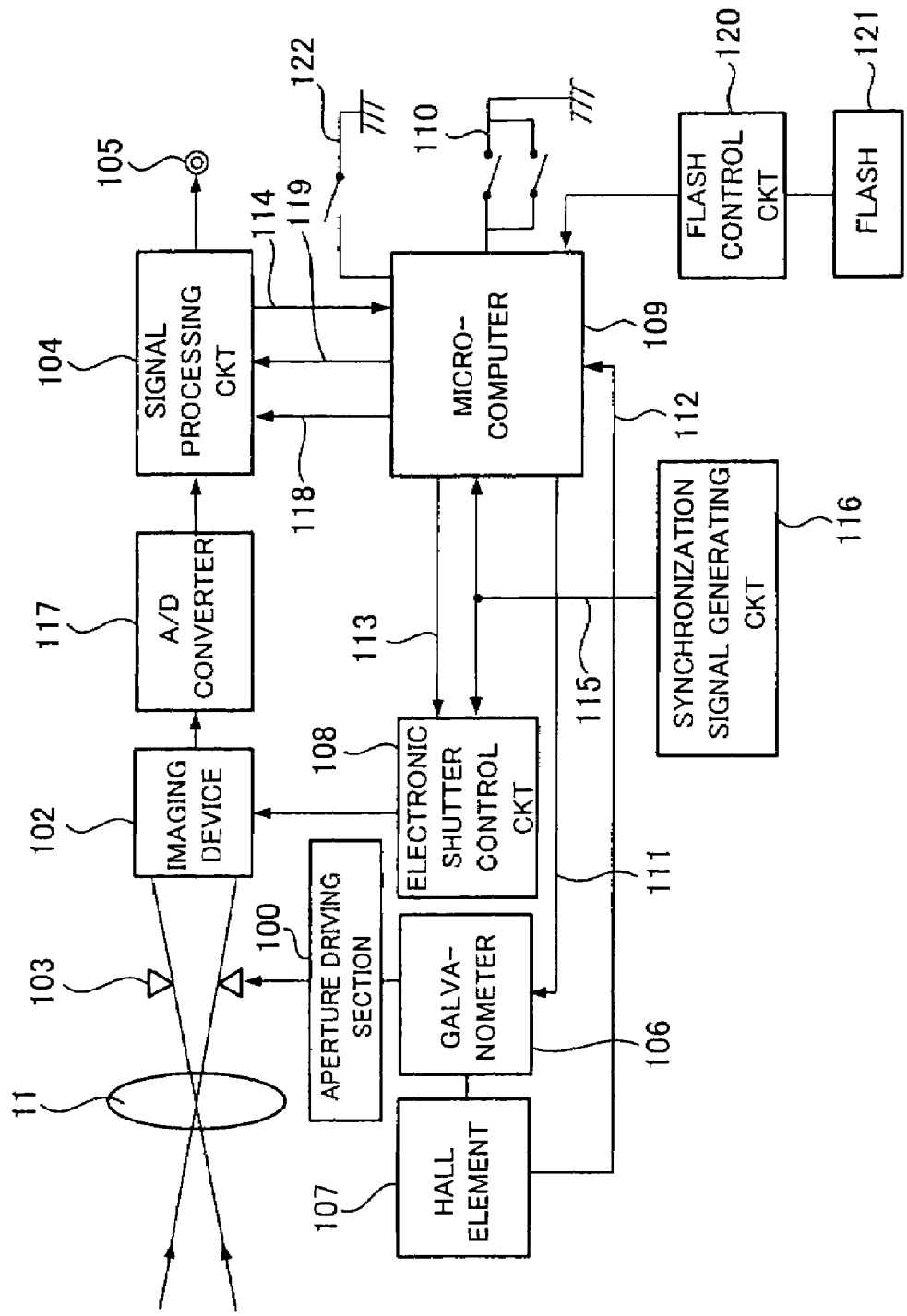
FIG. 6 is an internal structural view of a digital camera according to the present embodiment.

FIG. 6 is an internal structural view of a digital camera according to the present embodiment.

The digital camera shown in FIG. 6 comprises a lens 11 for condensing a subject light, an aperture blade 103, an imaging device (CCD) 102, an A/D converter 117, an output terminal 105, and a signal processing circuit 104. The subject light passing through the aperture blade 103 is formed on the imaging device 102 and is subjected to a photoelectric conversion.

The aperture blade 103 controls a light quantity of the subject light to be projecting onto the imaging device 102 and also may completely shut out the subject light. An output terminal of the imaging device 102 is connected to an input terminal of the A/D converter 117, so that an output signal of the imaging device 102 is subjected to an analog/digital conversion. An output of the A/D converter 117 is connected to an input terminal of the signal processing circuit 104, so that a digital output from the A/D converter 117 is fed to the signal processing circuit 104 to generate a video signal and is outputted to the output terminal 105.

The digital camera shown in FIG. 6 further comprises a microcomputer 109, a galvanometer 106, a Hall element 107, an electronic shutter control circuit 108, and a synchronization signal generating circuit 116. The signal processing circuit 104 is connected to the microcomputer 109 via transmission lines for transmitting a memory control circuit control signal 118, signal quantity information 114, and a dynamic picture image/still picture switching signal 119.

The galvanometer 106 is connected to the microcomputer 109, so that an aperture control signal 111 from the microcomputer 109 controls the aperture blade 103 via an aperture driving section 100.

The Hall element 107 is connected to the microcomputer 109 to detect an amount of rotation of the galvanometer 106. An aperture position detection signal 112 according to the detected amount of rotation is fed to the microcomputer 109.

An input terminal of the electronic shutter control circuit 108 is connected to the microcomputer 109. An input terminal of the electronic shutter control circuit 108 is connected to the imaging device 102. The electronic shutter control circuit 108 controls a storage period of an electrical charge in accordance with an electronic shutter speed control 113 from the microcomputer 109 in such a manner that an electrical charge generated in the imaging device 102 by the photoelectric conversion is discharged in a predetermined period.

The synchronization signal generating circuit 116 is connected to the microcomputer 109 and the electronic shutter control circuit 108 to supply a vertical synchronization signal 115 indicative of a start of fields.

Connected to the microcomputer 109 are a release button 110, a dynamic picture image/still picture switching button 122, and a flash control circuit 120. The flash control circuit 120 controls a flash unit 121.

Here, there will be explained the signal processing circuit 104.

Figure 7:
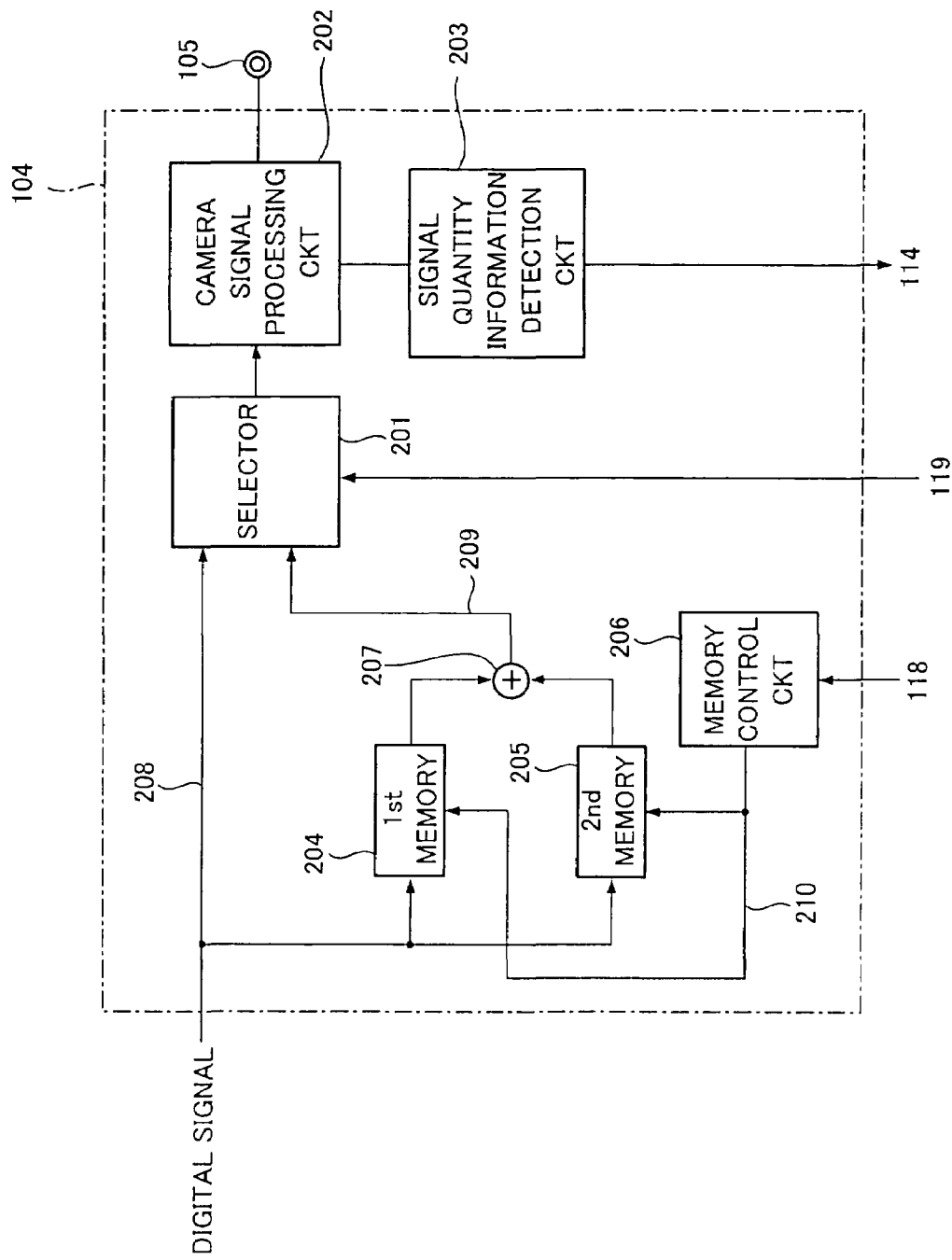
FIG. 7 is a structural block diagram of the signal processing circuit shown in FIG. 6.

FIG. 7 is a structural block diagram of the signal processing circuit 104 shown in FIG. 6.

The signal processing circuit 104 shown in FIG. 7 has a selector circuit 201 for performing a change over between a dynamic picture image and a still picture. An input terminal of the selector circuit 201 is connected to the output terminal of the A/D converter 117 to receive the digital signal from the A/D converter 117 shown in FIG. 6 in form of a dynamic picture signal 208. The output terminal of the A/D converter 117 is also connected to input terminals of a first memory 204 and a second memory 205, so that the dynamic picture signal 208 is fed to the first memory 204 and the second memory 205. The first memory 204 temporarily stores odd lines of video signals of the imaging device. The second memory 205 temporarily stores even lines of video signals of the imaging device. The first memory 204 and the second memory 205 are connected to a memory control circuit 206, which receives the memory control circuit control signal 118 from the microcomputer 109 shown in FIG. 6, and are controlled by a memory control signal 210 from the memory control circuit 206.

Output terminals of the first memory 204 and the second memory 205 are connected to an adder 207 to add contents of the first memory 204 and the second memory 205. An output terminal of the adder 207 is connected to another input terminal of the selector 201 to receive a still picture signal 209 as an addition result. The selector 201 receives the dynamic picture image/still picture switching signal 119. An output terminal of the selector 201 is connected to an input terminal of a camera signal processing circuit 202. One output terminal of the camera signal processing circuit 202 is connected to an input terminal of a signal quantity information detection circuit 203, and signal quantity information 114 is outputted from an output terminal of the signal quantity information detection circuit 203.

Next, there will be explained in detail operations of the camera at the times of the dynamic picture image photography and the still picture photography.

According to the digital camera 1, at both the times of the dynamic picture image photography and the still picture photography, regarding odd fields, reading for pixels on lines 2n-1 (where n is a natural number) is performed, and regarding even fields, reading for pixels on lines 2n (where n is a natural number) is performed.

When the selector 201 of the signal processing circuit 104 is changed over to the dynamic picture signal side in accordance with the dynamic picture image/still picture switching signal 119 from the microcomputer 109 shown in FIG. 6, so that the camera signal processing circuit 202 performs the signal processing, the dynamic picture image is outputted from the output terminal 105.

With respect to the still picture photography, the signals on the odd lines, which are read on the odd fields, are stored in the first memory 204 in accordance with the memory control signal 210 from the memory control circuit 206, and the signals on the even lines, which are read on the even fields, are stored in the second memory 205. The signals on the odd lines and the even lines once stored are repeatedly read from the first memory 204 and the second memory 205 in a frame cycle in the same combination as the reading of the imaging device 102 at the time of the dynamic picture image photography so that the adder 207 adds the signals on the odd lines and the even lines thus read to form a still picture signal. Thus, when the selector 201 is changed over to the still picture signal side in accordance with the dynamic picture image/still picture switching signal 119, so that the camera signal processing circuit 202 performs the signal processing, the still picture is outputted from the output terminal 105.

Figure 8:
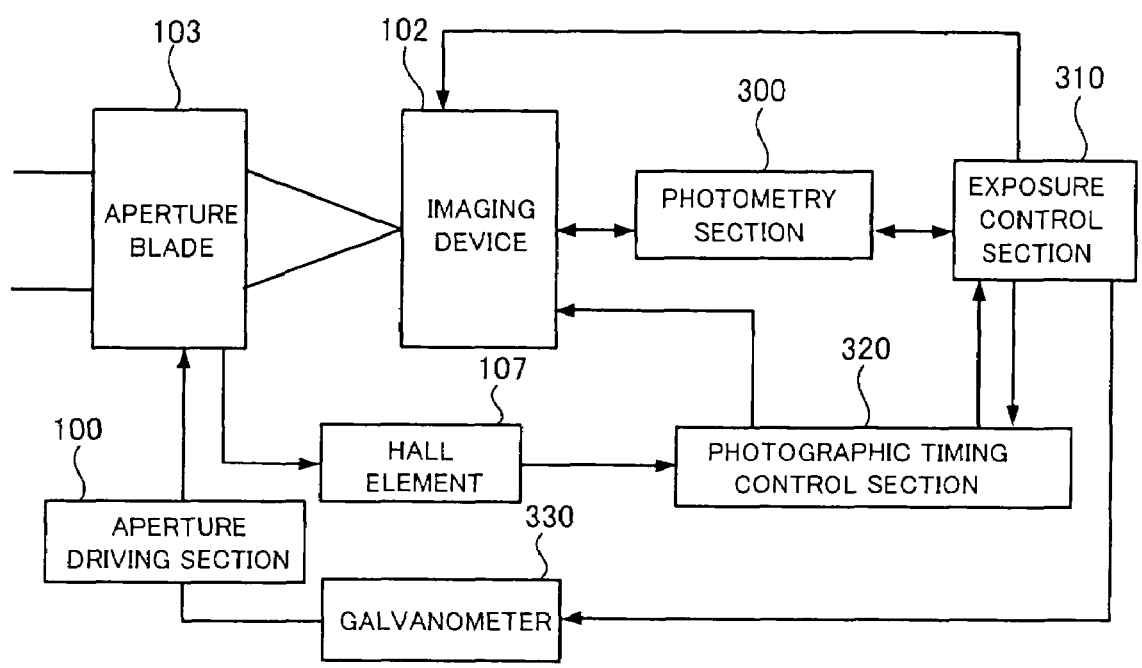
FIG. 8 is an internal block diagram of the digital camera of the present embodiment.

FIG. 8 is an internal block diagram of the digital camera of the present embodiment.

The digital camera shown in FIG. 8 comprises an aperture blade 103, a galvanometer 330 for controlling the aperture blade 103 through a aperture driving section 100, an imaging device 102, a photometry section 300 for measuring the subject brightness, an exposure control section 310 for determining photographic conditions in accordance with luminance information obtained from the photometry section 300, and a photographic timing control section 320 for controlling a photographic timing after receipt of the instruction from the release button 13.

Hereinafter, there will be described in detail the still picture photography in the digital camera 1 of the present embodiment referring to FIG. 8. Incidentally, with respect to the explanation of the dynamic picture image photography, it will be omitted since its principle has been described above.

In a state that the dynamic picture image/still picture switching button 122 shown in FIG. 6 is in the still picture side, when a camera operator trains the lens 11 on the subject and depresses the release button 13 to the first stage, the exposure control section 310 issues instructions to the galvanometer 330 to change the aperture to the "open end", and issues instructions to the photometry section 300 to carry out the photometry at the time point that the aperture blade 103 forms the "open end" by the aperture driving section 100.

The photometry section 300 transmits the photometry result of the subject brightness to the exposure control section 310. The exposure control section 310 determines in accordance with the photography result as to whether there are areas in which luminance on the imaging device 102 cannot be grasped. In the event that it is decided that there is no area in which luminance on the imaging device 102 cannot be grasped, the shutter speed associated with the aperture caliber "open end" is computed in accordance with the photography result, and completion of the set up of the photographic conditions is transmitted to the photographic timing control section 320. After the focus adjustment is terminated, a photography standby state offers until the release button 13 is depressed to the second stage, in other words, until the photography instruction from the photographic timing control section 320 is transmitted.

On the other hand, the exposure control section 310 issues instructions to the galvanometer 330 to change over to the "stop" side, if there are areas in which luminance on the imaging device 102 cannot be grasped. Thus, the aperture caliber changes over from the "open end" side to the "stop" side, and after the lapse of a predetermined time from the change over start, the photometry with the aperture caliber in the middle of the change over to the "stop" side is instructed.

Figure 9:
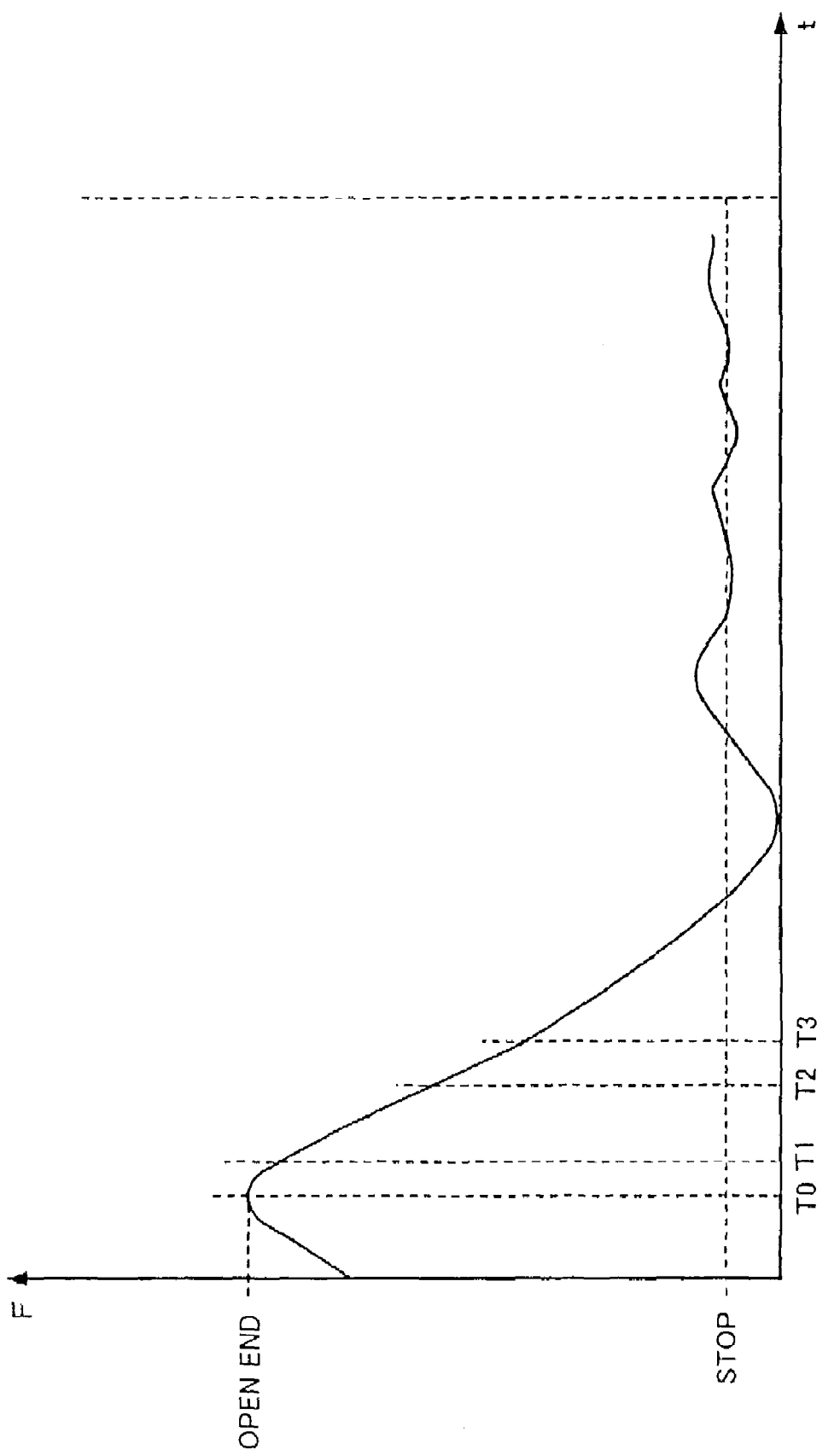
FIG. 9 is a view showing variations of an aperture of the digital camera according to the present embodiment.

FIG. 9 is a view showing variations of an aperture of the digital camera according to the present embodiment.

FIG. 9 is a graph showing a state of variations of an aperture caliber in the event that brightness of field cannot be grasped in the aperture caliber "open end". In the graph, the vertical axis denotes the aperture values (F-values) and the horizontal axis denotes time.

As shown in FIG. 9, the aperture blade 103 of the digital camera 1 goes toward the "open end" once and performs the photometry during time T0 to time T1. But since brightness of field cannot be grasped, the aperture blade 103 changes over to the "stop". In such a situation, according to the conventional case, the second photometry is carried out at the time when the aperture caliber offers the "stop", in other words, in the digital camera 1, the second photometry is carried out during time T2 to time T3 before the aperture caliber offers the "stop" state.

When the luminance on the imaging device 102 is completely grasped through the second photometry, the exposure control section 310 sets up a shutter speed associated with the "stop" in the aperture caliber in accordance with the photometry result at that time and the intermediate aperture caliber in variation of the aperture caliber during time T2 to time T3.

According to the digital camera 1, the photographic timing control section 320 controls a photographic timing in such a manner that even if the release button is depressed to the second stage S2 before the aperture caliber is converged to the "stop", the photography is not carried out as far as the aperture is converged to the "stop" as shown in FIG. 9. The photographic instruction is issued from the photographic timing control section 320 to the exposure control section 310.

Figure 10:
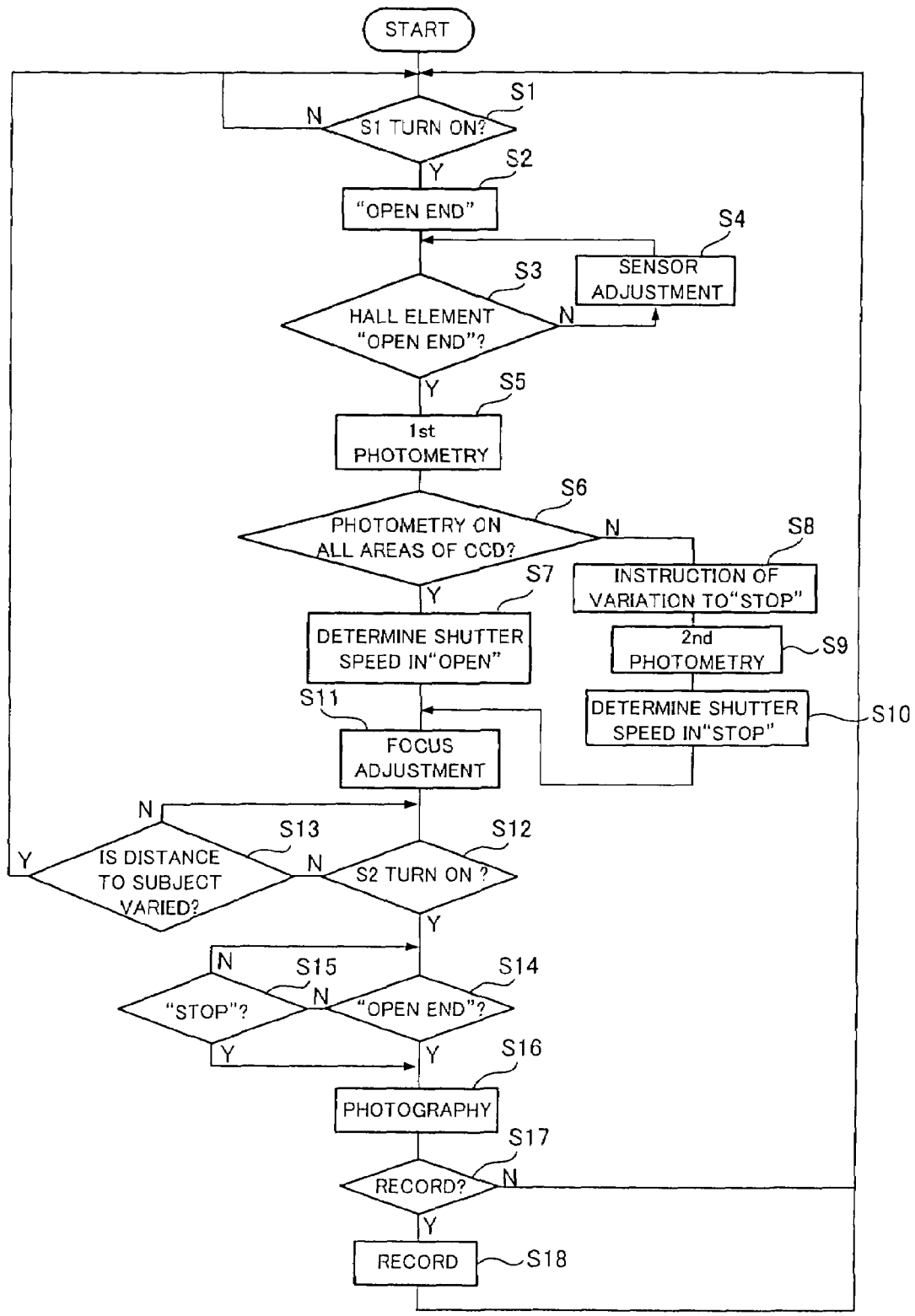
FIG. 10 is a flowchart of a routine to be executed in the digital camera according to the present embodiment.

FIG. 10 is a flowchart of a routine to be executed in the digital camera according to the present embodiment.

In step S1 of FIG. 10, it is determined whether the first stage (S1) of the release button 13 constituted of two stages is depressed. If it is decided that the first stage (S1) is not depressed, the process repeats the step S1. If it is decided that the first stage (S1) is depressed, the process goes to a step S2 in which an instruction is issued to vary the aperture caliber to the "open end". Thereafter, the process goes to a step S2 in which it is determined whether the Hall element 107 outputs a signal representative of the "open end" of the aperture caliber. In the step S3, if it is decided that the output is not exact, the process goes to step S4 in which an output of the Hall element is adjusted. In the step S3, if it is decided that the output is exact, the process goes to step S5 in which a first photometry is carried out. Thereafter, the process goes to a step S6 in which it is determined whether the photometry for the whole areas on the CCD imaging device can be done through the first photometry. If it is decided that the photometry for the whole areas can be done, the process goes to a step S7 in which the shutter speed associated with the "open end" of the aperture caliber is set up in accordance with the brightness of field obtained through the first photometry. Thereafter, in a step S11, the focus adjustment is carried out. In a step S12, waiting depression of the release button to the second stage (S2). When the release button is depressed to the second stage (S2), the process goes to a step S14 in which it is determined whether the aperture caliber is of the "open end". In the step S14, if it is decided that the aperture caliber is of the "open end", the process goes to a step S16 in which the photography is performed. In a step S17, it is determined whether image data obtained through the photography is recorded on a recording medium. If it is decided that a recording instruction button (not illustrated) is depressed to issue a recording instruction, the process goes to a step S18 in which the recording is performed. In the step S17, it is decided that the recording instruction is not issued, the process returns to the step S1. According to the digital camera 1, as mentioned above, when brightness of field can be grasped through the first photometry, the photography is carried out waiting for depression of the release button to the second stage (S2) maintaining the state of the "open end" of the aperture caliber.

On the other hand, in the step S6, when it is decided that the photometry on the whole areas cannot be done, the process goes to a step S8 in which an instruction is issued to vary the aperture caliber to the "stop". Thereafter, the process goes to a step S9 in which the second photometry is carried out in timing in the middle of variation toward the "stop". In a step 10, the shutter speed is set up in accordance with brightness of field obtained through the second photometry assuming that the aperture caliber is of the "stop". Thereafter, in the step S11, the focus adjustment is carried out. In the step S12, when it is decided that the release button is depressed to the second stage (S2), the process goes to the step S14, but in this case, in view of the fact that the aperture caliber is varied from the "open end" to the "stop", the process goes to a step S15 in which it is determined whether the aperture caliber is of the "stop". In the step S15, if it is decided that the aperture caliber is not in the "stop", the process returns to the step S14, and the step S14 and the step S15 are repeated until the aperture caliber offers the "stop". In the step S15, when it is decided that the aperture caliber offers the "stop", the process goes to the step S16. Incidentally, in the step S12, it is decided that the release button is not depressed to the second stage, the process goes to a step S13 in which it is determined whether variation of photographic object before depression of the release button to the second stage S2 causes variation in a distance to the subject. When it is decided that no variation occurs, the process returns to the step S12. When it is decided that variation occurs, the process returns to the step S1.

According to the digital camera 1 of the present embodiment as mentioned above, in the event that the photometry of brightness of field in the "open end" of the aperture caliber is impossible, it is possible to obtain luminance information more promptly as compared with the conventional ones, and in addition it is possible to perform the regular photography at the time point that the aperture caliber is steadied to the "stop". Thus, as compared with a case where a photography is performed with an aperture caliber that is different from the "stop" of an aperture caliber, which is set up in accordance with the subject brightness obtained through the photometry by the "stop" of an aperture caliber after the photometry by the "stop" of an aperture caliber, it is possible to reduce a time required for photography. Therefore, according to the digital camera 1 of the present embodiment, it is possible to reduce a time required for photography.

Next, there will be explained a camera according to another embodiment of the present invention.

The external appearance of a digital camera according to the present embodiment and a hardware structure are the same as those of the camera according to the first embodiment as mentioned above. Thus, the explanation will be omitted.

Figure 11:
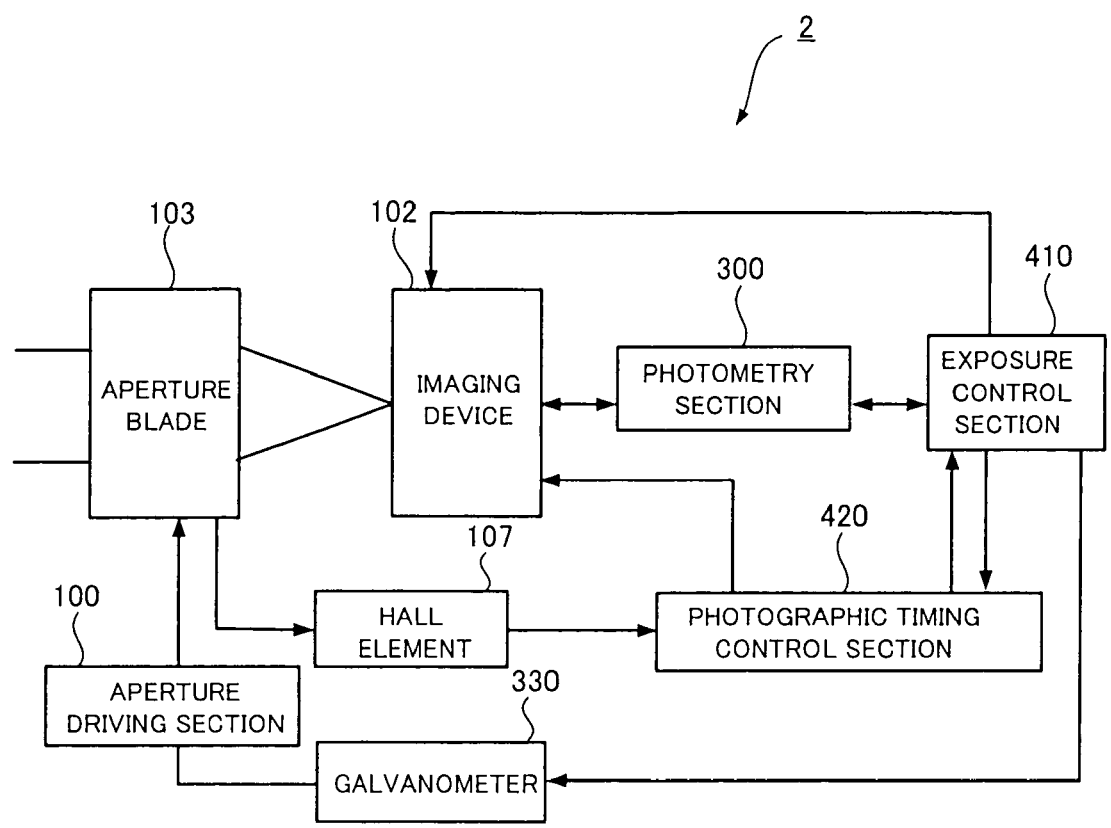
FIG. 11 is an internal block diagram of the digital camera of the present embodiment.

FIG. 11 is an internal block diagram of the digital camera of the present embodiment.

A digital camera 2 shown in FIG. 11 is the same as the digital camera 1 shown in FIG. 8 in the structure excepting for the exposure control section 410 and the photographic timing control section 420. As compared with the exposure control section 310 of the digital camera 1, the exposure control section 410 of the digital camera 2 is different in operation between the use of the flash 121 and no use of the flash 121. And as compared with the photographic timing control section 320 of the digital camera 1, the photographic timing control section 420 of the digital camera 2 is different in timing of outputting the photography instruction after the second photometry to the exposure control section.

Hereinafter, there will be described in detail the still picture photography in the digital camera 2 of the present embodiment referring to FIG. 11. Incidentally, as to the explanation of the dynamic picture image photography, the principle thereof is mentioned above and thus it will be omitted.

In a state that the dynamic picture image/still picture switching button 122 shown in FIG. 6 is in the still picture side, when a camera operator trains the lens 11 on the subject and depresses the release button 13 to the first stage, the exposure control section 410 issues instructions to the galvanometer 330 to change the aperture to the "open end", and issues instructions to the photometry section 300 to carry out the photometry at the time point that the aperture blade 103 forms the "open end" by the aperture driving section 100.

The photometry section 300 transmits the photometry result of the subject brightness to the exposure control section 410. The exposure control section 410 determines in accordance with the photography result as to whether there are areas in which luminance on the imaging device 102 cannot be grasped. In the event that it is decided that there is no area in which luminance on the imaging device 102 cannot be grasped, the shutter speed associated with the aperture caliber "open end" is computed in accordance with the photography result, and completion of the set up of the photographic conditions is transmitted to the photographic timing control section 420. After the focus adjustment is terminated, a photography standby state offers until the release button 13 is depressed to the second stage, in other words, until the photography instruction from the photographic timing control section 420 is transmitted. Incidentally, the above-mentioned feature is independent of use and non-use of the flash.

On the other hand, the exposure control section 410 issues instructions to the galvanometer 330 to change over to the "stop" side, if there are areas in which luminance on the imaging device 102 cannot be grasped. Thus, the aperture caliber changes over from the "open end" side to the "stop" side, and after the lapse of a predetermined time from the change over start, the photometry with the aperture caliber in the middle of the change over to the "stop" side is instructed.

When the luminance on the imaging device 102 is completely grasped through the second photometry, the exposure control section 410 changes over operations depending on a situation that the use of the flash 121 is needed in accordance with the grasped brightness of field.

First, in the event that the use of the flash 121 is needed, as to the grasped brightness of field, the shutter speed is set up assuming that the aperture caliber is of the "stop", photography is performed waiting depression of the release button 13 to the second stage S2, and after the photography an exposure adjustment is performed to image data obtained through the photography. Accordingly, in photography at a stage that time from the set up of the shutter speed to the depression of the release button 13 to the stage S2 is short, and the aperture caliber is not steadied to the "stop", the shutter speed, wherein the aperture caliber is set up in association with the "stop", is not appropriate. Thus, after the photography, the exposure adjustment is carried out. Incidentally, in the event that time from the set up of the shutter speed to the depression of the release button 13 to the stage S2 is long, and photography is performed after the aperture caliber is steadied to the "stop", the exposure adjustment is not needed.

On the other hand, in the event that the use of the flash 121 is not needed, the aperture caliber at the time point when the release button 13 is depressed to the second stage S2 is detected, and the shutter speed is set up in accordance with the detected aperture caliber. Accordingly, also in this case, the exposure adjustment is not needed.

The photographic timing control section 420 of the digital camera 2 is different from the photographic timing control section 320 of the digital camera 1 is different from the following point. While the photographic timing control section 420 immediately outputs the photographic instruction signal upon receipt of depression of the release button 13 to the stage S2, the photographic timing control section 320 does not output the photographic instruction signal until the aperture caliber becomes the "stop" even if the release button 13 is depressed to the stage S2. Accordingly, the digital camera 2 is different from the digital camera 1 in the following point. If the release button 13 is depressed to the stage S2, photography is carried out, even if the aperture caliber does not reach the "stop". Thus, it is possible to reduce the time required for the photography as compared with the digital camera 1.

Figure 12:
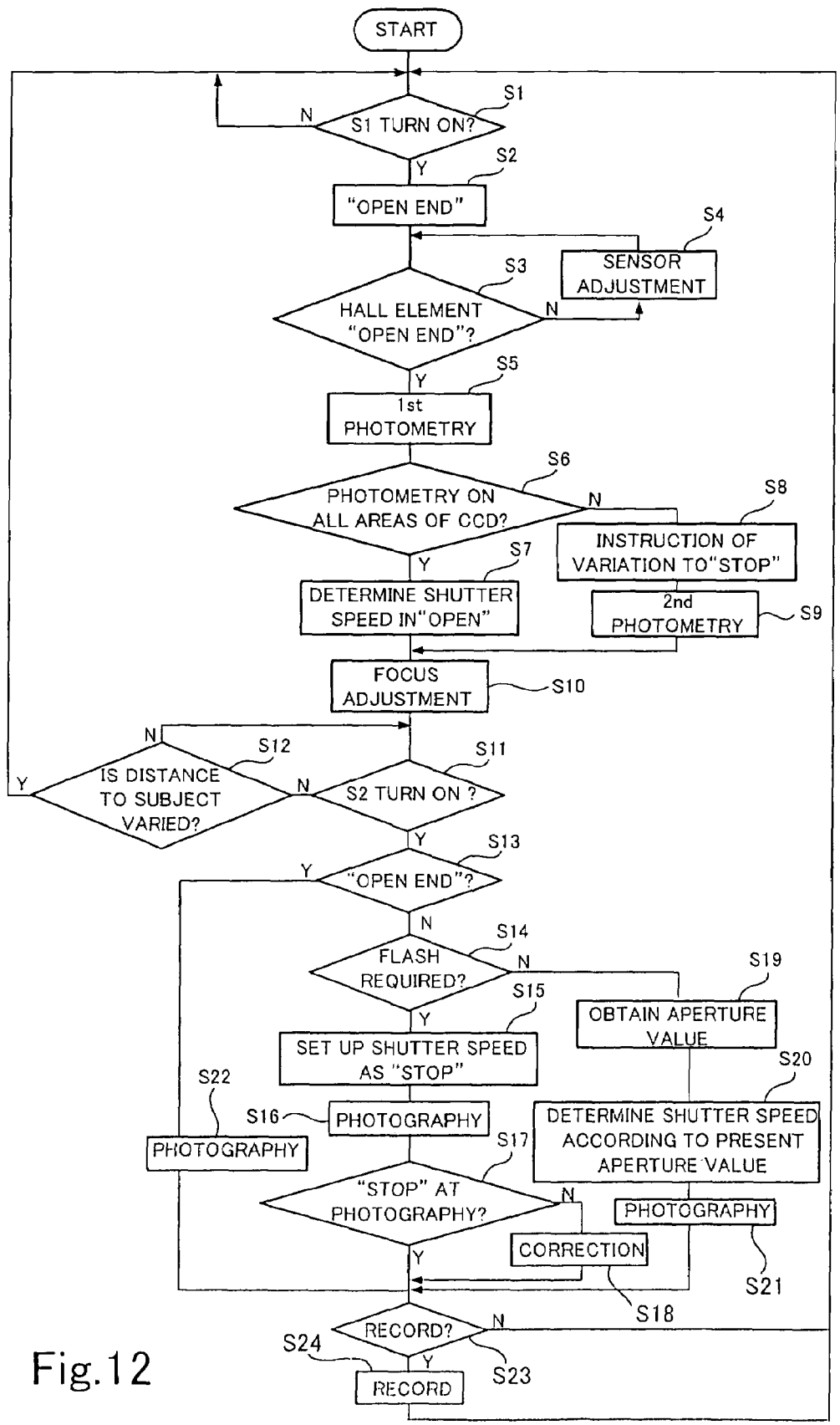
FIG. 12 is a flowchart of a routine to be executed in the digital camera according to the present embodiment.

FIG. 12 is a flowchart of a routine to be executed in the digital camera according to the present embodiment.

A step 1 to a step 10 shown in FIG. 12 are the same as those shown in FIG. 10 and thus the explanation will be omitted.

In a step 11, when the release button 13 is depressed to the second stage S2, the process goes to a step S13 in which it is determined whether the aperture caliber is of the "open end". If it is decided that the aperture caliber is of the "open end", the process goes to a step S22 in which photography is performed. Thereafter, the process goes to a step S23 in which it is determined whether image data obtained through the photography is recorded onto the recording medium. If it is decided that a recording instruction button (not illustrated) is depressed, and a recording instruction is issued, the process goes to a step S24 in which recording is carried out. In the step S23, if it is decided that a recording instruction is not issued, the process returns to the step S1. Also in the digital camera 2, as described above, when brightness of field can be grasped through the first photometry, the photography is carried out waiting for depression of the release button to the second stage (S2) maintaining the state of the "open end" of the aperture caliber.

On the other hand, in the step S13, when it is decided that the aperture caliber is not of the "open end", the process goes to a step S14 in which it is determined whether the flash is used. If it is decided that the flash is used, the process goes to a step S15 in which the shutter speed is set up in accordance with the brightness of field obtained through the second photometry, where the aperture caliber is of the "stop". Thereafter, the process goes to a step S16 in which photography is carried out. In a step S17, it is determined whether the aperture caliber reaches the "stop" when the photography is carried out. If it is decided that the aperture caliber reaches the "stop", the process goes to the step S23. If it is decided that the aperture caliber does not reach the "stop", the process goes to a step S18 in which the image data obtained through the photography is subjected to an exposure adjustment.

In the step S14, when it is decided that the flash is not used, the process goes to a step S19 in which the present aperture caliber is detected. In a step S20, a shutter speed is set up in accordance with the detected aperture caliber. Thereafter, in a step S21, photography is carried out.

According to the digital camera 2, in the step S17, it is determined whether the aperture caliber reaches the "stop" when the photography is carried out in the step S16, and it is determined whether the exposure correction for the image data obtained through the photography is performed in accordance with the result. However, the present invention is not restricted to this way. It is acceptable that these decisions are made in accordance with the image data obtained through the photography.

According to the digital camera 1 and the digital camera 2, as the first aperture caliber referred to in the present invention, there is raised the "open end" by way of example. However, any one is acceptable, as the "open end", which is relatively large aperture caliber, and the first aperture caliber is not restricted to the "open end".

As mentioned above, according to a camera of the present invention, it is possible to reduce the time required for photography.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A camera incorporating therein an aperture member which is variable in an aperture caliber including a completely closed condition and changes over to an aperture caliber after an alteration with a predetermined response speed in accordance with an alteration instruction of the aperture caliber, wherein a subject light incident through an aperture of the aperture member is received by an imaging device to create image data, the camera comprising:

a sensor that monitors the aperture caliber of the aperture member;

an aperture control section that controls the aperture caliber of the aperture member;

a photometry section that measures brightness of field in accordance with light quantity of received light by the imaging device, and an exposure control section that controls an exposure in accordance with the brightness of field measured by the photometry section, wherein the photometry section measures the brightness of field when the aperture member is of a predetermined first aperture caliber which is a relatively large aperture caliber, and measures the brightness of field in halfway through change over of the aperture member from the first aperture caliber to a predetermined second aperture caliber which is relatively smaller than the first aperture caliber when a photometry of the brightness of field is impossible because of an exposure over with the first aperture caliber, wherein the exposure control section controls the exposure in accordance with the brightness of field measured by the photometry section and an aperture caliber in a photometric timing of the brightness of field, of the aperture member, which is monitored by the sensor, when the photometry section measures the brightness of field in halfway through change over of the aperture member from the first aperture caliber to the second aperture caliber, wherein the exposure control section determines in accordance with the brightness of field measured by the photometry section whether there are areas in which luminance on an imaging device cannot be grasped, and wherein if there is no area in which luminance on the imaging device cannot be grasped, the shutter speed associated with an open end aperture caliber is computed.

2. A camera according to claim 1, wherein the camera further comprises a photography timing control section that performs photography in a state that the aperture member is in the first aperture caliber and in a state that the aperture member is steadied to the second aperture caliber in accordance with whether a photometry of the brightness of field, wherein the aperture member is in the first aperture caliber, is possible or impossible, and wherein the exposure control section controls a shutter speed.

3. A camera according to claim 1, wherein the camera further comprises a photography timing control section that performs photography in a state that the aperture member is in the first aperture caliber and performs photography regardless of a state that the aperture member is steadied to the second aperture caliber in accordance with whether a photometry of the brightness of field, wherein the aperture member is in the first aperture caliber, is possible or impossible, and wherein the exposure control section controls a shutter speed, and in a case where a measurement of the brightness of field is impossible when the aperture member is in the first aperture caliber, the exposure control section controls the shutter speed in accordance with the brightness of field measured by the photometry section in halfway through change over of the aperture member from the first aperture caliber to the second aperture caliber, an aperture caliber in a photometric timing of the brightness of field, of the aperture member, which is monitored by the sensor, and an aperture caliber in a photographic timing, of the aperture member, which is monitored by the sensor.

4. A camera incorporating therein an aperture member which is variable in an aperture caliber including a completely closed condition and changes over to an aperture caliber after an alteration with a predetermined response speed in accordance with an alteration instruction of the aperture caliber, wherein a subject light incident through an aperture of the aperture member is received by an imaging device to create image data, the camera comprising:

an aperture control section that controls the aperture caliber of the aperture member;

a photometry section that measures brightness of field in accordance with light quantity of received light by the imaging device, and an exposure control section that controls an exposure in accordance with the brightness of field measured by the photometry section, wherein the photometry section measures the brightness of field when the aperture member is of a predetermined first aperture caliber which is a relatively large aperture caliber, and measures the brightness of field in halfway through change over of the aperture member from the first aperture caliber to a predetermined second aperture caliber which is relatively smaller than the first aperture caliber when a photometry of the brightness of field is impossible because of an exposure over with the first aperture caliber, wherein the camera further comprises a photography timing control section that performs photography in a state that the aperture member is in the first aperture caliber and performs photography regardless of a state that the aperture member is steadied to the second aperture caliber in accordance with whether a photometry of the brightness of field, wherein the aperture member is in the first aperture caliber, is possible or impossible, wherein the exposure control section controls a shutter speed, and in a case where a measurement of the brightness of field is impossible when the aperture member is in the first aperture caliber, the exposure control section controls the shutter speed regarding as the brightness of field measured by the photometry section in halfway through change over of the aperture member from the first aperture caliber to the second aperture caliber being measured when the aperture member is in the second aperture caliber, and an exposure is corrected on the created image data, wherein the exposure control section determines in accordance with the brightness of field measured by the photometry section whether there are areas in which luminance on an imaging device cannot be grasped, and wherein if there is no area in which luminance on the imaging device cannot be grasped, the shutter speed associated with an open end aperture caliber is computed.

5. A camera according to claim 1, wherein if there are areas in which luminance on the imaging device cannot be grasped, the aperture caliber changes from the open end aperture caliber to a stop side aperture caliber; and wherein after a lapse of a predetermined amount of time from the start of the aperture caliber change from the open end to the stop side aperture caliber, the exposure control section instructs the photometry section to measure the brightness of field.

* * * * *